(12) United States Patent
Barton

(10) Patent No.: US 9,655,297 B2
(45) Date of Patent: May 23, 2017

(54) SCRAPER WITH WINGS FOR DISC FURROW OPENER

(71) Applicant: Peter Hugh Barton, Conquest Saskatchewan (CA)

(72) Inventor: Peter Hugh Barton, Conquest Saskatchewan (CA)

(*) Notice: Subject to any disclaimer, the term of this patent is extended or adjusted under 35 U.S.C. 154(b) by 101 days.

(21) Appl. No.: 14/519,629

(22) Filed: Oct. 21, 2014

(65) Prior Publication Data

US 2015/0107501 A1    Apr. 23, 2015

(30) Foreign Application Priority Data

Oct. 22, 2013   (CA) ...................................... 2830611

(51) Int. Cl.
| | | |
|---|---|---|
| A01C 5/06 | (2006.01) |
| A01C 7/06 | (2006.01) |
| A01B 15/16 | (2006.01) |
| A01B 23/06 | (2006.01) |

(52) U.S. Cl.
CPC .............. *A01C 5/064* (2013.01); *A01B 15/16* (2013.01); *A01B 23/06* (2013.01); *A01C 7/06* (2013.01)

(58) Field of Classification Search
USPC .................................. 111/121; 172/196, 558
See application file for complete search history.

(56) References Cited

U.S. PATENT DOCUMENTS

| | | | | | |
|---|---|---|---|---|---|
| 678,248 | A | * | 7/1901 | Hoyt ...................... | A01B 23/06 111/168 |
| 711,626 | A | * | 10/1902 | Heath .................... | A01C 5/064 111/168 |
| 769,101 | A | * | 8/1904 | Mitchell ................ | A01C 5/064 111/168 |
| 776,504 | A | * | 12/1904 | Faas ....................... | A01B 23/06 111/168 |
| 1,299,160 | A | * | 4/1919 | Fetzer .................... | A01C 5/064 111/163 |
| 1,416,331 | A | * | 5/1922 | Campbell .............. | A01C 5/062 111/140 |
| 2,869,489 | A | * | 1/1959 | Buhr ...................... | A01C 5/064 111/150 |

(Continued)

FOREIGN PATENT DOCUMENTS

| | | | | |
|---|---|---|---|---|
| FR | 2694998 A1 | * | 3/1994 | ............. A01C 5/064 |
| FR | 2727601 A1 | * | 6/1996 | ............. A01B 15/04 |

*Primary Examiner* — Alicia Torres
(74) *Attorney, Agent, or Firm* — Patterson Thuente Pedersen, P.A.

(57) ABSTRACT

A scraper body adapted to be attached to a furrow opener assembly with a disc rotatably mounted on an arm and oriented at a horizontal angle to create a disc furrow. The scraper body has an attachment body portion adapted to be attached to the furrow opener assembly such that a forward scraping edge of the scraper body scrapes soil from the disc face. A wing member extends from a lower rear portion of the scraper body, and has a top wing member edge oriented in alignment with the disc furrow and with the operating travel direction. Right and left wings extending downward and outward from the top wing member edge to bottom wing edges located above a bottom edge of the disc such that in operation the wings push soil to corresponding right and left sides of the disc furrow to create right and left wing furrows.

18 Claims, 2 Drawing Sheets

(56) References Cited

U.S. PATENT DOCUMENTS

| | | | | |
|---|---|---|---|---|
| 2,917,012 | A | * | 12/1959 | Oehler .................. A01C 5/064 111/157 |
| 3,213,812 | A | * | 10/1965 | Forsyth ................ A01C 5/064 111/157 |
| 4,502,547 | A | * | 3/1985 | MacIntyre ............ A01B 15/18 111/140 |
| 4,998,488 | A | * | 3/1991 | Hansson ............... A01C 5/064 111/121 |
| 5,495,814 | A | * | 3/1996 | Primus ................ A01C 23/025 111/124 |
| 5,531,171 | A | * | 7/1996 | Whitesel ............... A01C 23/02 111/121 |
| 5,609,114 | A | | 3/1997 | Barton |
| 6,302,040 | B2 | * | 10/2001 | Lempriere .................. 111/124 |
| 7,540,246 | B2 | | 6/2009 | Friesen et al. |
| 7,568,438 | B2 | | 8/2009 | Arksey |

* cited by examiner

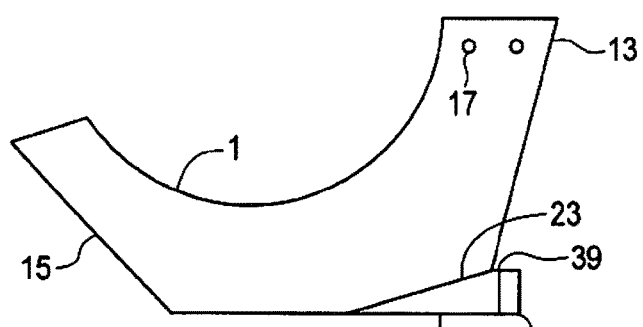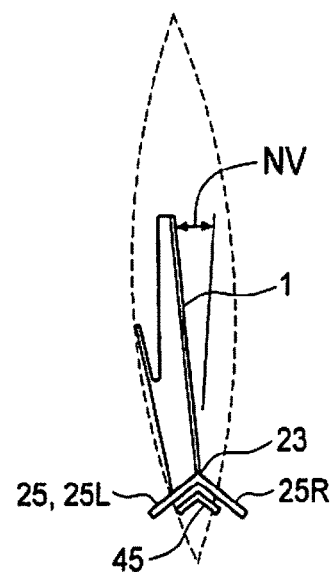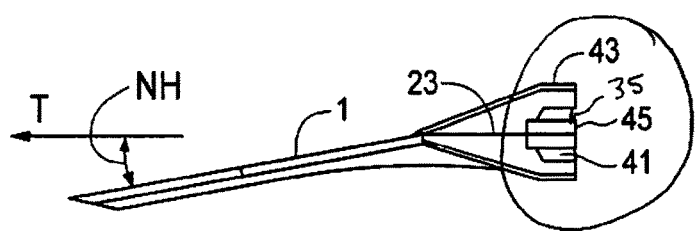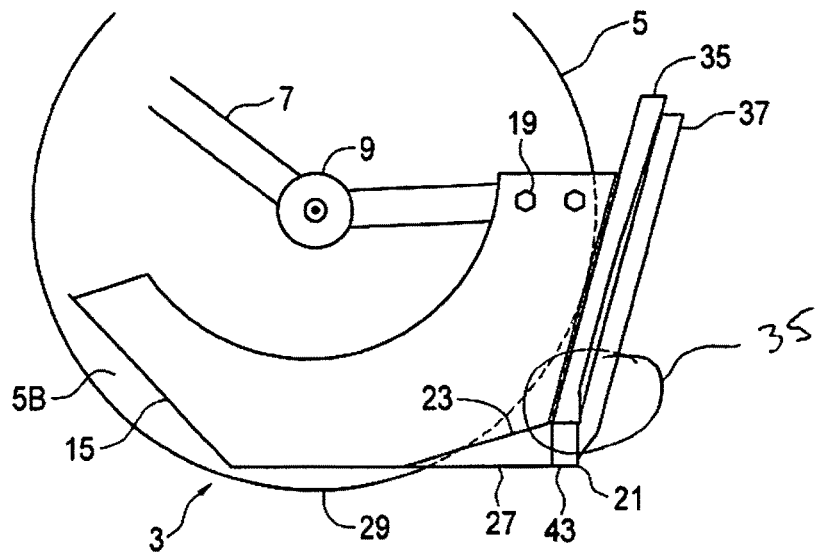

SCRAPER WITH WINGS FOR DISC FURROW OPENER

RELATED APPLICATIONS

This application claims the benefit of Canadian Application No. 2,830,611, filed Oct. 22, 2013, said prior application being hereby fully incorporated by reference herein.

FIELD OF THE INVENTION

This disclosure relates to the field of agricultural implements and in particular furrow opener assemblies for seeding implements.

BACKGROUND OF THE INVENTION

Seeding implements typically include a furrow opener assembly which includes a furrow opener that engages the ground to create a furrow in the soil surface, and a feed tube oriented to feed agricultural products such as seed or fertilizer into the furrow. A following packer wheel can be included in the rear of the assembly to close the furrow over the product.

Disc type furrow opener assemblies are well known and include a rotating disc which is oriented to rotate in a plane that is at a horizontal angle to the operating travel direction such that a leading face of the disc pushes soil laterally to one side, and a furrow is created in the soil adjacent to the opposite trailing face of the disc.

The disc may be oriented at a compound angle with the horizontal angle to the operating travel direction and also a vertical angle somewhat down from vertical such that the leading face of the disc is oriented somewhat upward and lifts the soil as it pushes it laterally. Such a compound angle orientation causes the soil to impart a downward force component on the leading upper face and helps the disc to penetrate hard soils. Placement of the product can be improved as well. U.S. Pat. No. 5,609,114 to the present inventor Barton describes a furrow opener assembly with such a compound angled disc.

U.S. Pat. No. 7,540,246 to Friesen and the present inventor Barton discloses a furrow opener assembly with such a compound angle disc, and a scraper body with a forward scraping edge arranged to scrape a forward portion of the trailing face of the disc. The scraper body flares outward from the disc as it extends rearward from the scraping edge and seed and fertilizer feed tubes are located between the scraper body and the trailing face of the disc. A wing extends laterally away from the disc at a bottom end of the scraper and into the wall of the furrow to create a groove, and the seed feed tube directs seed into the groove, and the fertilizer feed tube directs fertilizer into the furrow made by the disc. U.S. Pat. No. 7,568,438 to Arskey discloses a similar furrow opener assembly with a wing extending laterally from the bottom end of the scraper in a direction away from the disc.

These wings bear laterally against the soil beside the disc furrow which in turn pushes the scraper body laterally towards the disc with a force that varies depending on soil conditions, being greater when the soil is hard and lesser when the soil is soft. The structure of the scraper body must be designed to maintain the scraper body in a substantially fixed position with respect to the disc as these forces vary, since the disc may stop rotating if the scraper bears against the disc with any significant force.

SUMMARY OF THE INVENTION

The present disclosure provides a scraper for a disc furrow opener assembly that overcomes problems in the prior art.

In a first embodiment the present disclosure provides a scraper body adapted to be attached to a furrow opener assembly, the furrow opener assembly comprising a disc rotatably mounted on an arm and oriented at a horizontal angle to an operating travel direction such that a leading face of the disc pushes soil laterally to create a disc furrow in a soil surface, the disc having a trailing face opposite the leading face. The scraper body comprises an attachment body portion adapted to be attached to the arm of the furrow opener assembly such that a forward scraping edge of the scraper body is located to scrape soil from the trailing face of the disc. A wing member extends from a lower rear portion of the scraper body, the wing member comprising a top wing member edge oriented, when the scraper body is attached to the arm, in alignment with the disc furrow and in alignment with the operating travel direction. Right and left wings extending downward and outward from the top wing member edge to bottom wing edges located above a bottom edge of the disc such that in operation the wings push soil to corresponding right and left sides of the disc furrow to create right and left wing furrows.

In a second embodiment the present disclosure provides furrow opener assembly comprising a disc rotatably mounted on an arm and oriented at a horizontal angle to an operating travel direction such that a leading face of the disc pushes soil laterally to create a disc furrow in a soil surface, the disc having a trailing face opposite the leading face. A scraper body is mounted on the arm such that a forward scraping edge of the scraper body is located to scrape soil from the trailing face of the disc. A wing member extends from a lower rear portion of the scraper body, the wing member comprising a top wing member edge aligned with the disc furrow and aligned with the operating travel direction, and right and left wings extending downward and outward from the top wing member edge to bottom wing edges located above a bottom of the disc furrow such that the wings push soil to corresponding right and left sides of the disc furrow to create right and left wing furrows. A first feed tube is operative to direct a first agricultural product into the right and left wing furrows, and a second feed tube is operative to direct a second agricultural product agricultural product into the disc furrow.

The scraper body can replace present scraper bodies made by various manufacturers retro-fit attachment by configuring the attachment portion to attach to the existing furrow opener assemblies with their various arm configurations, or can be incorporated into an original equipment furrow opener assembly.

A first agricultural product such as seed is deposited in a pair of rows above and to each side of the second agricultural product, such as fertilizer a desirable arrangement as is known in the prior art where separation of seed and fertilizer is desirable. The wing member also reduces the incidence of "hair-pinning", where conventional disc openers are known to push straws to the bottom the disc furrows where the straws wick moisture out of the soil and reduce contact between soil and seeds hindering seed germination.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic side view of an embodiment of a scraper body of the present disclosure;

FIG. 2 is a schematic rear view of the scraper body of FIG. 1;

FIG. 3 is a schematic bottom view of the scraper body of FIG. 1;

FIG. 4 is a schematic side view of the scraper body of FIG. 1 mounted on a furrow opener assembly comprising a disc rotatably mounted on an arm;

DETAILED DESCRIPTION OF THE DRAWINGS

Figure 5:
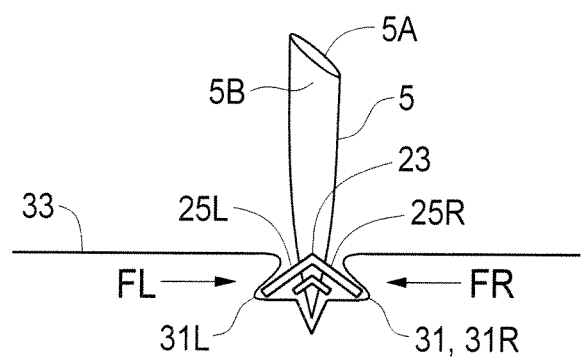
FIG. 5 is a schematic rear view of the disc and wing member of the furrow opener assembly illustrated in FIG. 4 in engagement with a soil surface.

FIGS. 1-3 schematically illustrate an embodiment of a scraper body 1 of the present disclosure. The scraper body 1 is adapted to be attached to a furrow opener assembly 3 such as is schematically illustrated in FIG. 4, the furrow opener assembly 3 comprising a disc 5 rotatably mounted on an arm 7 by a hub 9. The disc 5 is oriented at a horizontal angle NH, shown in FIG. 3, to the operating travel direction T of a seeding implement such that a leading face 5A of the disc 5, as schematically illustrated in FIG. 5, pushes soil laterally to create a disc furrow 11 in the soil surface. The disc 5 has a trailing face 5B opposite the leading face 5A.

The scraper body 1 comprises an attachment body portion 13 adapted to be attached to the arm of the furrow opener assembly 3 such that a forward scraping edge 15 of the scraper body 1 is located to scrape soil from the trailing face 5B of the disc 5. It is contemplated that the scraper body can be attached the arm 7 in a variety of ways. In the illustrated scraper 1 the attachment body portion 13 comprises clamp holes 17 defined through the scraper body 1. A clamp member, such as one or more bolts 19, extends through the clamp holes 17 to clamp the scraper body 1 to the arm 7.

A wing member 21 extends from a lower rear portion of the scraper body 1. The wing member 21 comprises a top wing member edge 23 oriented, when the scraper body 1 is attached to the arm 7, in alignment with the disc furrow 11 and in alignment with the operating travel direction T. Right and left wings 25R, 25L extend downward and outward from the top wing member edge 23 to bottom wing edges 27 located above a bottom edge 29 of the disc 5, as seen in FIG. 4, such that in operation the wings 25 push soil to corresponding right and left sides of the disc furrow 11 to create right and left wing furrows 31R, 31L in a soil surface 33 as shown in FIG. 5.

The top wing member edge 23 slopes upward from a front end thereof to a rear end thereof such that the wings 25 also slope upward and lift the soil, which in turn exerts a downward force on the wings 25 and improves penetration of the wings 25.

The wings 25 are the same size such that the wing furrows 31 have substantially the same width and depth. The right and left wings 25R, 25L thus bear against the soil with equal force, and the soil in turn exerts equal lateral forces FR and FL against the corresponding right and left wings 25R, 25L such that the net lateral force on the wing member 21 is zero. Thus regardless of soil conditions which will vary the magnitude of the lateral forces FR and FL, the net force on the wing member 21 will be essentially zero, and the scraper body 1 will not be pushed toward the trailing face 5B of the disc 5 with varying forces as in the prior art. The illustrated scraper body 1 is shown attached to a furrow opener assembly 3 where the disc 5 is further oriented at a downward angle NV from vertical, as seen in FIG. 2, such that the leading face 5A of the disc 5 pushes soil upward as well as laterally. Such a disc orientation is well known in the prior art and improves penetration of the disc 5.

The illustrated scraper body 1 is provided by a formed plate, and the lower rear portion of the plate is bent laterally and vertically into alignment with the top wing member edge 23, and thus into alignment with the operating travel direction T and the disc furrow 11.

The illustrated scraper body 1 also includes a first feed tube 35 oriented to direct a first agricultural product into each wing furrow 31 and a second feed tube 37, attached rearward of the first feed tube 35, is oriented to direct a second agricultural product into the disc furrow 11.

The top wing edges 39 of the right and left wings 25R, 25L extend outward and rearward from a rear end of the top wing member edge 23 and rear portions 43 of the right and left wings are parallel. Thus an opening 41 is formed between the top wing edges 39 of the right and left wings 25R, 25L. The first feed tube 35 directs the first agricultural product into the opening 41 and the bottom end of the first feed tube 35 seals the opening 41 such that soil cannot flow into the opening 41.

A deflector 45 extends rearward from the rear end of the top wing member edge 23 along a middle of the opening 41. The deflector 45 is operative to deflect agricultural product flowing from the first feed tube 35 substantially equally into the right and left wing furrows 31R, 31L. The parallel rear portions 43 of the wings 25 keep soil from falling back into the wing furrows 31 until after the agricultural products from the first feed tube are deposited in the wing furrows 31.

Figure 6:
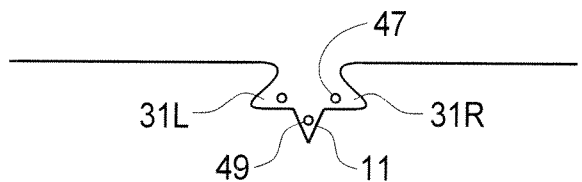
FIG. 6 is a schematic sectional view of the disc furrow and wing furrows made by the furrow opener assembly illustrated in FIG. 4 with agricultural products deposited in the furrows.

FIG. 6 schematically illustrates the first agricultural product 47 from the first feed tube 35 lying in the right and left wing furrows 31R, 31L and the second agricultural product 49 from the second feed tube 37 lying in the disc furrow 11. As the wing member 21 moves soil falls back over the agricultural products 47, 49 to some extent, and further closing wheels, packing wheels, as are known in the prior art complete the covering and packing of the agricultural products 47, 49.

The wing member 21 of the scraper body 1 of the present disclosure is aligned with the operating travel direction T and provides a wing furrow 31 on either side of the disc furrow 31 made by a conventional disc furrow opener assembly 3. The scraper body 1 is subjected to equal right and left lateral forces FR, FL in hard and soft soil conditions, such that there are no uneven forces urging the front scraper edge 15 of the scraper body 1 against the trailing face 5B of the disc 5.

The first agricultural product 47 is deposited in a pair of rows above and to each side of the second agricultural product 49, a desirable arrangement as is known in the prior art.

The scraper body 1 is also useful in reducing "hairpinning", which occurs when conventional disc openers push straws to the bottom the disc furrows instead of cutting through the straws. These straws wick moisture out of the soil and reduce contact between soil and agricultural products such as seeds, which contact is desired to promote even seed germination. Depending on how the hair-pinned straws are oriented, the wings 25 will drag a significant number of such straws out of the disc furrow 11 and push them to the side.

Thus the scraper body 1 can be useful in a furrow opener assembly 3 that includes only a single feed tube, either tube 35 directing agricultural products into the disc furrow 11, or feed tube 37 directing agricultural products into the wing furrows 11. Typically a single feed tube version will have the feed tube direct agricultural products into the disc furrow 11, and will be somewhat narrower than the version with two feed tubes. It is contemplated that the version with two feed tubes will be about 2.25 inches wide at the outside of the wings 25, while the version with a single feed tube will be about 1.50 inches wide at the outside of the wings 25.

Figure 7:
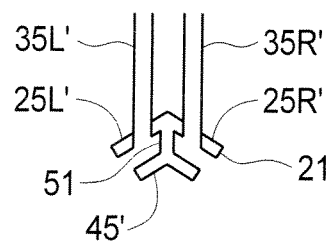
FIG. 7 is schematic rear view of a wing member for depositing different products into the right and left wing furrows.
Figure 8:
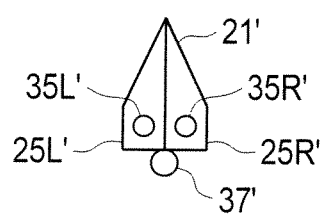
FIG. 8 is a schematic top view of the wing member of FIG. 7.

FIGS. 7 and 8 schematically illustrate wing member 21' for attachment to the scraper body 1 that has a wall 51 extending up from the center of the deflector 45' and right and left feed tubes 35R', 35L' extending through corresponding holes in the right and left wings 25R', 25L' to deposit one product from the right feed tube 35R' into the right wing furrow and a different product from the left feed tube 35L' into the left wing furrow. A third feed tube 37' can deposit a third product into the disc furrow 11 if desired.

The attachment body portion 13 of the scraper body 1 can be configured for retro-fit attachment to existing furrow opener assemblies 3 made by different manufacturers with their various arm configurations, or can be incorporated into an original equipment furrow opener assembly.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A scraper body adapted to be attached to a furrow opener assembly, the furrow opener assembly comprising a disc rotatably mounted on an arm and oriented at a horizontal angle to an operating travel direction such that a leading face of the disc pushes soil laterally to create a disc furrow in a soil surface, the disc having a trailing face opposite the leading face, the scraper body comprising:
   an attachment body portion adapted to be attached to the arm of the furrow opener assembly such that a forward scraping edge of the scraper body is located to scrape soil from the trailing face of the disc;
   a wing member extending from a lower rear portion of the scraper body, the wing member comprising a top wing member edge oriented, when the scraper body is attached to the arm, in alignment with the disc furrow and in alignment with the operating travel direction; and
   right and left wings extending downward and outward from the top wing member edge to bottom wing edges located above a bottom edge of the disc such that in operation the wings push soil to corresponding right and left sides of the disc furrow to create right and left wing furrows;
   a first feed tube oriented to direct a first agricultural product into each wing furrow and a second feed tube oriented to direct a second agricultural product into the disc furrow;
   wherein top wing edges of the right and left wings extend outward and rearward from a rear end of the top wing member edge such that an opening is formed between the top wing edges of the right and left wings, and wherein the first feed tube directs the first agricultural product into the opening and a bottom end of the first feed tube substantially seals the opening, and
   a deflector with sides sloping downward and outward from a top edge thereof that extends rearward from the top wing member edge along a middle of the opening, the deflector operative to deflect the first agricultural product flowing from the first feed tube substantially equally into the right and left wing furrows.

2. The scraper body of claim 1 wherein the disc is further oriented at a downward angle from vertical such that the leading face of the disc pushes soil upward.

3. The scraper body of claim 1 wherein the second feed tube is rearward of the first feed tube.

4. The scraper body of claim 1 wherein the top wing member edge slopes upward from a front end thereof to a rear end thereof.

5. The scraper body of claim 1 wherein the attachment body portion comprises clamp holes defined through the scraper body, and further comprising a clamp member extending through the clamp holes.

6. The scraper body of claim 1 wherein the scraper body is provided by a formed plate, and wherein the lower rear portion of the scraper body is bent into alignment with the top wing member edge.

7. The scraper body of claim 1 wherein the right and left wing furrows have substantially the same width and depth.

8. The scraper body of claim 1 wherein rear portions of the right and left wings are parallel.

9. A furrow opener assembly comprising:
   a disc rotatably mounted on an arm and oriented at a horizontal angle to an operating travel direction such that a leading face of the disc pushes soil laterally to create a disc furrow in a soil surface, the disc having a trailing face opposite the leading face;
   a scraper body mounted on the arm such that a forward scraping edge of the scraper body is located to scrape soil from the trailing face of the disc;
   a wing member extending from a lower rear portion of the scraper body, the wing member comprising a top wing member edge aligned with the disc furrow and aligned with the operating travel direction, and right and left wings extending downward and outward from the top wing member edge to bottom wing edges located above a bottom of the disc furrow such that the wings push soil to corresponding right and left sides of the disc furrow to create right and left wing furrows;
   a first feed tube operative to direct a first agricultural product into the right and left wing furrows;
   a second feed tube operative to direct a second agricultural product into the disc furrow;
   wherein top wing edges of the right and left wings extend outward and rearward from a rear end of the top wing member edge such that an opening is formed between the top wing edges of the right and left wings, and wherein the first feed tube directs the first agricultural product into the opening and a bottom end of the first feed tube substantially seals the opening;

a deflector with sides sloping downward and outward from a top edge thereof that extends rearward from the rear end of the top wing member edge along a middle of the opening, the deflector operative to deflect the first agricultural product flowering from the first feed tube substantially equally into the right and left wing furrows.

10. The assembly of claim 9 wherein the disc is oriented at a downward angle from vertical such that the leading face of the disc pushes soil upward.

11. The assembly of claim 9 wherein the second feed tube is rearward of the first feed tube.

12. The assembly of claim 9 wherein the top wing member edge slopes upward from a front end thereof to a rear end thereof.

13. The assembly of claim 9 comprising clamp holes defined through the scraper body, and further comprising a clamp member extending through the clamp holes.

14. The assembly of claim 9 wherein the scraper body is provided by a formed plate, and wherein the lower rear portion of the scraper body is bent into alignment with the top wing member edge.

15. The assembly of claim 9 wherein the right and left wing furrows have substantially the same width and depth.

16. The assembly of claim 9 wherein rear portions of the right and left wings are parallel.

17. A scraper body adapted to be attached to a furrow opener assembly, the furrow opener assembly comprising a disc rotatably mounted on an arm and oriented at a horizontal angle to an operating travel direction such that a leading face of the disc pushes soil laterally to create a disc furrow in a soil surface, the disc having a trailing face opposite the leading face, the scraper body comprising:

an attachment body portion adapted to be attached to the arm of the furrow opener assembly such that a forward scraping edge of the scraper body is located. to scrape soil from the trailing face of the disc;

a wing member extending from a lower rear portion of the scraper body, the wing member comprising a top wing member edge oriented, when the scraper body is attached to the arm, in alignment with the disc furrow and in alignment with the operating travel direction; and right and left wings extending downward and outward from the top wing member edge to bottom wing edges located above a bottom edge of the disc such that in operation the wings push soil to corresponding right and left sides of the disc furrow to create right and left wing furrows;

wherein rear portions of the right and left wings extend rearward and slope downward and outward from a rear end of the top wing member edge, and top edges of the rear portions of the right and left wings are joined;

a wall extending downward from the joined top edges of the rear portions of the right and left wings;

a right deflector sloping downward and outward in a right direction from a bottom edge of the wall;

a left deflector sloping downward and outward in a left direction from a bottom edge of the wall;

a right feed tube extending through a in the rear portion of the right wing and configured such that agricultural products flowing from the right feed tube contact the right deflector and are directed into the right wing furrow;

a left feed tube extending through a hole in the rear portion of the left wing and configured such that agricultural products flowing from the left feed tube contact the left deflector and are directed into the left wing furrow.

18. The scraper body of claim 17 comprising a third feed tube attached to a rear end of the joined top edges of the rear portions of the right and left wings, the third feed tube configured such that agricultural products flowing from the third feed tube arc directed into the disc furrow.

* * * * *